April 21, 1936. E. G. M. R. LEGÉ 2,038,369
METHOD FOR TRANSFORMING HYDROCARBONS
Filed Jan. 23, 1934
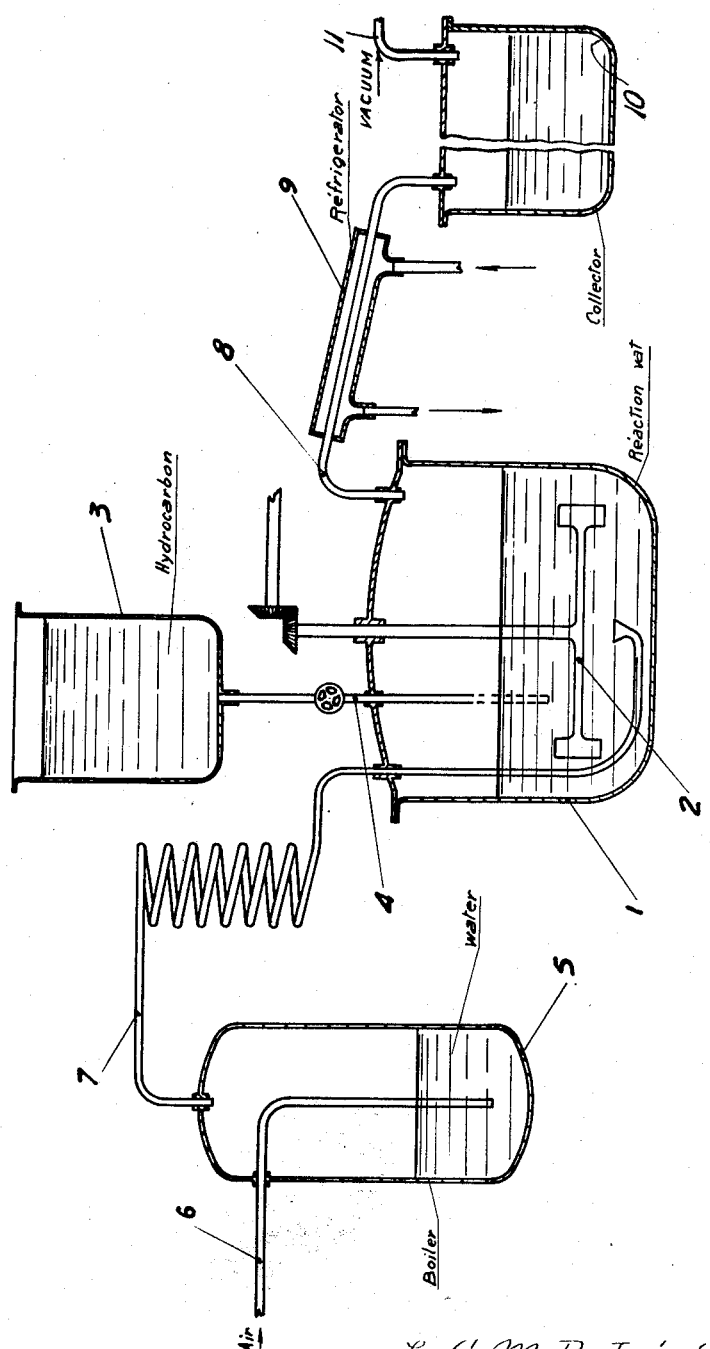

Patented Apr. 21, 1936

2,038,369

UNITED STATES PATENT OFFICE 2,038,369

METHOD FOR TRANSFORMING HYDROCARBONS

Edouard Georges Marie Romain Legé, Paris, France

Application January 23, 1934, Serial No. 708,011
In France February 2, 1933

9 Claims. (Cl. 196—52)

My invention has for its object a method for the transformation of hydrocarbons consisting chiefly in causing them to react with sulphuric acid having a concentration of between 48 and 66° Baumé (i. e. a specific weight between 1.5 and 1.845) at temperatures between 150° and 250° C. so as to submit them simultaneously to partial oxidizing, cracking, condensation, ring forming and desulphurizing processes. Generally speaking the principal reaction may be called a partial oxidizing carbonization. By these words I intend that I shall more or less oxidize the hydrogen atoms of the hydrocarbons, without oxidizing the carbon atoms of the molecule, either to CO or to $CO_2$. The transformed hydrocarbons are continuously distilled or removed by means of a current of inert gas, and/or air and/or steam passing through the reacting media. There is formed in the sulphuric bath a carbonaceous deposit which may be collected and transformed through washing and calcination into very pure and minutely divided carbon black while the sulphurous acid evolved may be recovered. A similar process for preparing very finely divided carbon is described in my copending application, Ser. No. 708,012, filed January 23, 1934.

For executing the reaction between sulphuric acid and the hydrocarbons to be transformed, I may proceed in several manners, I may admix hydrocarbons to the sulphuric acid and raise the mixture to the desired temperature between 150 and 250° C. I may also introduce the hydrocarbon into the heated bath of sulphuric acid held at the desired temperature.

The reaction is furthered by the use of catalyzers constituted by metals or metallic compounds such as iron, lead, nickel, copper, mercury, cobalt, alumina, soda, potash, magnesia and the like.

The pressure of distillation may vary above or below atmospheric pressure without producing any detrimental modification in the results. But it is often of advantage to apply vacuum so as to further the distillation.

As a starting material, I may use for transformation purposes any available hydrocarbon, whether cyclic or non-cyclic, saturated or non-saturated: gas-oils, fuel-oils, crude-oils, turpentine, vegetable oils, etc. . . . The hydrocarbons obtained will vary with the hydrocarbons to be transformed, the temperature of reaction applied and the concentrations used. They are formed, for the major part, of hydrocarbons, saturated or not, of the ring compound type and have, for this reason, remarkable anti-knock properties. These liquids which are colored generally to a certain extent, may be advantageously submitted to rectification and produce thus a perfectly clear liquid. They contain mostly naphthenic, chiefly monocyclic, hydrocarbons with a little paraffin, aromatic hydrocarbons and very little ethylenic hydrocarbons.

Examples (a) I prepare a mixture of 600 cm.³ of sulphuric acid at 65° Baumé with 200 cm.³ of distilled water. I heat the mixture to a temperature of 150° to 180° and I make three litres of gas oil having a specific weight of 0.844 fall slowly on its surface, the pouring of the gas oil lasting five hours. I send at the same time into the sulphuric bath a current of a mixture of air and steam for partly oxidizing the hydrocarbons and carrying away the oil transformed the volume of which is 2420 cm.³, said oil being very clear even without any rectification and having a specific weight of 0.835.

(b) I prepare a mixture of 300 cm.³ of sulphuric acid at 65° Baumé with 100 cm.³ of distilled water. The mixture is heated to a temperature comprised between 175° and 185° C. and I make 100 cm.³ of Venezuelan crude oil having a specific weight of 0.950 fall slowly on the surface of the mixture, the pouring of the oil lasting about one hour. At the same time I make a current of a mixture of air and steam pass through the sulphuric bath. This current oxidizes partly the hydrocarbons and draws out of the bath 40 cm.³ of a liquid composed almost exclusively of monocyclic hydrocarbons having a specific weight of about 0.850 and after washing and calcination of the solid residue, it is possible to also collect 40 to 50 gr. of carbonaceous residue adapted to be transformed into carbon black.

The appended drawing shows a diagrammatical view of an apparatus which may be employed in order to carry out the method according to my invention.

The reaction vat 1 heated by any suitable source of heat not shown and provided with stirring means 2, contains concentrated sulphuric acid. The hydrocarbon is placed in a reservoir 3 provided with a tube 4 entering said reaction vat 1 and opening over the reaction bath, if it is desired to pour the hydrocarbon on to the surface of the bath or inside said bath (as shown in dotted lines) if it is desired to make the hydrocarbon pass directly into the mass of the bath.

A boiler 5 inside the water of which a pipe 6 feeds a current of air affords means for the injection through the pipe 7 of a current of air and steam into the mass of the reaction bath. This pipe 7 will preferably comprise means diagrammatically represented by a coil for overheating the current of air and steam in order to give said current substantially the temperature of the reaction bath.

The transformed hydrocarbons pass out of the vat through the pipe 8 into the refrigerator 9 and thence into the collector 10 inside which it is possible to produce partial vacuum through the agency of the pipe 11.

What I claim is:

1. A method for treating hydrocarbons consisting in making these hydrocarbons react on sulphuric acid the concentration of which is comprised between 48 and 66° Baumé so that at every moment the hydrocarbon is in presence of an excess of sulphuric acid, at temperatures ranging between 150° and 250° C. under injection into the reacting mixture of a current of steam, during a time sufficient for producing partial oxidizing carbonization and collecting the transformed hydrocarbons.

2. A method for treating hydrocarbons consisting in making these hydrocarbons react on sulphuric acid the concentration of which is comprised between 48 and 66° Baumé so that at every moment the hydrocarbon is in presence of an excess of sulphuric acid, at temperatures ranging between 150° C. and 250° C. under injection into the reacting mixture of a current of steam and a current of air, during a time sufficient for producing partial oxidizing carbonization and collecting the transformed hydrocarbons.

3. A method for treating hydrocarbons consisting in making these hydrocarbons react on sulphuric acid the concentration of which is comprised between 48 and 66° Baumé so that at every moment the hydrocarbon is in presence of an excess of sulphuric acid, at temperatures ranging between 150° and 250° C., under injection into the reacting mixture of a current of steam, during a time sufficient for producing partial oxidizing carbonization and removing continuously the transformed hydrocarbons through the agency of a partial vacuum.

4. A method for treating hydrocarbons consisting in making these hydrocarbons react on sulphuric acid the concentration of which is comprised between 48 and 66° Baumé so that at every moment the hydrocarbon is in presence of an excess of sulphuric acid, at temperatures ranging between 150° C. and 250° C., under injection into the reacting mixture of a current of steam and a current of air during a time sufficient for producing partial oxidizing carbonization and removing continuously the transformed hydrocarbons through the agency of a partial vacuum.

5. A method for treating hydrocarbons consisting in mixing these hydrocarbons with sulphuric acid the concentration of which is comprised between 48 and 66° Baumé and the amount of which is at least equal to that of hydrocarbons, maintaining said mixture at temperatures ranging between 150° and 250° C., under injection into said reacting mixture of a current of steam during a time sufficient for producing partial oxidizing carbonization and collecting the transformed hydrocarbons.

6. A method for treating hydrocarbons consisting in heating sulphuric acid having a concentration comprised between 48 and 66° Baumé to a temperature comprised between 150° C. and 250° C., introducing hydrocarbons into said acid so that at every moment the hydrocarbon is in presence of an excess of acid, maintaining the reacting mixture under injection of a current of steam at temperature comprised between 150 and 250° C., during a time sufficient for producing partial oxidizing carbonization and collecting the transformed hydrocarbons.

7. A method for treating hydrocarbons consisting in heating sulphuric acid having a concentration comprised between 48 and 66° Baumé to a temperature comprised between 150° and 250° C., pouring slowly hydrocarbons on to the surface of said acid so that at every moment the hydrocarbon is in presence of an excess of acid, under injection of a current of steam, maintaining the acid bath at temperatures comprised between 150° and 250° C., and collecting the transformed hydrocarbons.

8. A method for treating hydrocarbons consisting in making the hydrocarbons react on sulphuric acid the concentration of which is comprised between 48 and 66° Baumé so that at every moment the hydrocarbon is in presence of an excess of sulphuric acid, at temperatures ranging between 150° and 250° C., under addition of metallic catalysers and under injection into the reacting mixture of a current of steam, during a time sufficient for producing partial oxidizing carbonization, and collecting the transformed hydrocarbons.

9. A method for treating hydrocarbons consisting in making these hydrocarbons react on sulphuric acid the concentration of which is comprised between 48° and 66° Baumé so that at every moment the hydrocarbon is in presence of an excess of sulphuric acid, at temperatures ranging between 150° and 250° C., under injection into the reacting mixture of a current of steam, during a time sufficient for producing partial oxidizing carbonization, collecting and rectifying the transformed hydrocarbons.

EDOUARD GEORGES MARIE
ROMAIN LEGÉ.